United States Patent
Xiang et al.

(10) Patent No.: US 12,238,703 B2
(45) Date of Patent: Feb. 25, 2025

(54) REFERENCE SIGNAL TRANSMISSION METHOD, APPARATUS, AND SYSTEM

(71) Applicant: HUAWEI TECHNOLOGIES CO., LTD., Guangdong (CN)

(72) Inventors: Zhengzheng Xiang, Shanghai (CN); Hongjia Su, Shanghai (CN); Wenting Guo, Shanghai (CN); Lei Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 399 days.

(21) Appl. No.: 17/840,067

(22) Filed: Jun. 14, 2022

(65) Prior Publication Data

US 2022/0312441 A1    Sep. 29, 2022

Related U.S. Application Data

(63) Continuation of application No. PCT/CN2019/130644, filed on Dec. 31, 2019.

(51) Int. Cl.
*H04W 72/1263* (2023.01)
*H04W 72/23* (2023.01)

(52) U.S. Cl.
CPC ....... *H04W 72/1263* (2013.01); *H04W 72/23* (2023.01)

(58) Field of Classification Search
CPC .................... H04W 72/1263; H04W 72/23
See application file for complete search history.

(56) References Cited

U.S. PATENT DOCUMENTS

| | | | |
|---|---|---|---|
| 2018/0368157 A1 | 12/2018 | Jeon et al. | |
| 2021/0168814 A1* | 6/2021 | Chen | H04W 72/02 |
| 2022/0159583 A1* | 5/2022 | Wang | H04L 5/0051 |

FOREIGN PATENT DOCUMENTS

| | | | | |
|---|---|---|---|---|
| CN | 109792371 A | 5/2019 | | |
| WO | WO-2019099535 A1 * | 5/2019 | ......... | H04L 27/2613 |

OTHER PUBLICATIONS

CATT, "DL Reference Signals for NR Positioning," 3GPP TSG RAN WG1 #97, R1-1906305, Reno, USA, May 13-17, 2019, 17 pages.

Huawei et al., "Design and contents of PSCCH and PSFCH," 3GPP TSG RAN WG1 Meeting #97, R1-1906596, Reno, USA, May 13-17, 2019, 12 pages.

Huawei et al., "Sidelink physical layer procedures for NR V2X," 3GPP TSG RAN WG1 Meeting #96bis, R1-1903944, Xi'an, China, Apr. 8-12, 2019, 17 pages.

PCT International Search Report and Written Opinion issued in International Application No. PCT/CN2019/130644 on Sep. 30, 2020, 15 pages (with English translation).

(Continued)

*Primary Examiner* — Michael A Keller
(74) *Attorney, Agent, or Firm* — Fish & Richardson P.C.

(57) ABSTRACT

This application provides example reference signal transmission methods, apparatuses, and systems. An example method includes determining a first transmission parameter in at least two transmission parameters, where any two of the at least two transmission parameters are different, and the first transmission parameter is used to determine a first transmission resource for a first reference signal. The first reference signal is sent to a second communication apparatus on the first transmission resource.

20 Claims, 6 Drawing Sheets

(56) References Cited

OTHER PUBLICATIONS

Extended European Search Report issued in European Application No. 19958569.9 on Nov. 10, 2022, 9 pages.
Interdigital, Inc., "Physical Layer Structure for NR V2X Sidelink," 3GPP TSG RAN WG1 #99, R1-1913274, Reno, USA, Nov. 18-22, 2019, 19 pages.
LG Electronics, "Discussion on Physical Layer Structure for NR Sidelink", 3GPP TSG RAN WG1 #99, R1-1913235, Reno, USA, Nov. 18-22, 2019, 36 pages.

* cited by examiner

REFERENCE SIGNAL TRANSMISSION METHOD, APPARATUS, AND SYSTEM

CROSS-REFERENCE TO RELATED APPLICATIONS

This application is a continuation of International Application No. PCT/CN2019/130644, filed on Dec. 31, 2019, the disclosure of which is hereby incorporated by reference in its entirety.

TECHNICAL FIELD

This application relates to the field of communication technologies, and in particular, to a reference signal transmission method, an apparatus, and a system.

BACKGROUND

Vehicle-to-everything (V2X) communication is communication between a vehicle and anything outside the vehicle, for example, communication between vehicles, communication between a vehicle and a pedestrian, communication between a vehicle and an infrastructure, and communication between a vehicle and a network. Vehicle-user equipment (V-UE) can send some information about the vehicle-user equipment, for example, a location, a speed, and an intention (turning, merging, or reversing), to surrounding V-UE. The V-UE also receives information about the surrounding V-UE. In this way, communication between the V-UEs, namely, sidelink communication, is completed.

A physical sidelink control channel (PSCCH) and a physical sidelink shared channel (PSSCH) are introduced into the V2X communication. The PSCCH is used to carry sidelink control information (SCI), and the SCI is used to schedule the PSSCH, so that sidelink communication can be performed between V-UEs. A reference signal, for example, a demodulation reference signal (DMRS), is transmitted on the physical sidelink control channel, and the reference signal may be used for channel estimation. For example, a first terminal apparatus sends a physical sidelink control channel to a second terminal apparatus, where the physical sidelink control channel carries sidelink control information and a reference signal. The second terminal apparatus measures the reference signal, and uses a measurement result to perform channel estimation on the physical sidelink control channel, to be specific, evaluates a parameter such as channel quality of the physical sidelink control channel based on the measurement result, so that the second terminal apparatus receives, based on the channel estimation on the physical sidelink control channel, the physical sidelink control information carried on the physical sidelink control channel.

In an actual scenario, reference signals between a plurality of terminal apparatuses may be transmitted by using a same resource. In this case, the plurality of reference signals conflict with or affect each other, and channel estimation is inaccurate when the terminal apparatus receives the reference signals for channel estimation.

SUMMARY

This application provides a reference signal transmission method, an apparatus, and a system, to improve accuracy of channel estimation.

According to a first aspect, this application provides a reference signal transmission method, including: A first communication apparatus determines a first transmission parameter in at least two transmission parameters, where any two of the at least two transmission parameters are different, and the first transmission parameter is used to determine a first transmission resource for a first reference signal; and the first communication apparatus sends the first reference signal to a second communication apparatus on the first transmission resource. The first communication apparatus may be a first terminal apparatus.

In embodiments of this application, different terminal apparatuses determine the first transmission parameter in the at least two transmission parameters. However, any two of the at least two transmission parameters are different. In this case, the different terminal apparatuses transmit reference signals based on the different transmission parameters, so that conflicts between the reference signals of the different terminal apparatuses can be reduced, and accuracy of channel estimation can be improved.

In a possible design, that a first communication apparatus determines a first transmission parameter in at least two transmission parameters includes: The first communication apparatus determines the first transmission parameter in the at least two transmission parameters based on identification information of the first communication apparatus and a correspondence between identification information of at least two communication apparatuses and the at least two transmission parameters.

In a possible design, the at least two transmission parameters and the correspondence between the identification information of the at least two communication apparatuses and the at least two transmission parameters are predefined in a protocol; the first communication apparatus receives first configuration information from a first network apparatus, where the first configuration information indicates the at least two transmission parameters and the correspondence between the identification information of the at least two communication apparatuses and the at least two transmission parameters; or the first communication apparatus receives second configuration information from a third communication apparatus, where the second configuration information indicates the at least two transmission parameters and the correspondence between the identification information of the communication apparatuses and the transmission parameters. Alternatively, the correspondence between the identification information of the at least two communication apparatuses and the at least two transmission parameters is predefined in a protocol, and the first communication apparatus receives third configuration information from a first network apparatus, where the third configuration information indicates the at least two transmission parameters. Alternatively, the correspondence between the identification information of the at least two communication apparatuses and the at least two transmission parameters is predefined in a protocol, and the first communication apparatus receives fourth configuration information from a third communication apparatus, where the second configuration information indicates the at least two transmission parameters. Therefore, flexibility of transmission parameter configuration can be improved.

In a possible design, an identifier of the first communication apparatus includes M bits, the identification information of the first communication apparatus includes N bits of the identifier of the first communication apparatus, the N bits belong to the M bits, and both M and N are positive integers. The identification information of the first communication apparatus is used to determine the transmission parameter used to transmit the reference signal, so that system design complexity is reduced.

In a possible design, the first communication apparatus sends first sidelink control information to the second communication apparatus on a resource other than the first transmission resource in a second transmission resource, where the second transmission resource includes the first transmission resource.

In a possible design, the first sidelink control information includes M−N bits other than the N bits in the identifier of the first communication apparatus. Therefore, resource overheads of the control information can be reduced.

In a possible design, the first sidelink control information is carried on a first sidelink control channel, and the first reference signal is used for channel estimation on the first sidelink control channel.

In a possible design, that the first transmission parameter is used to determine a first transmission resource for a first reference signal includes: The first transmission parameter is used to determine a transmission pattern for the first reference signal, where the transmission pattern is used to determine the first transmission resource.

In a possible design, the first transmission parameter includes a resource offset, and the resource offset is used to determine a start location or the transmission pattern of the transmission resource for the first reference signal.

In a possible design, the first transmission resource includes at least two sub-resources, each of the at least two sub-resources is used to transmit the first reference signal, and the at least two sub-resources are frequency division multiplexed. Optionally, the at least two sub-resources may alternatively be time division multiplexed.

According to a second aspect, a reference signal transmission method is provided. The method includes: A first network apparatus determines first configuration information, where the first configuration information is used to indicate at least two transmission parameters and a correspondence between identification information of at least two communication apparatuses and the at least two transmission parameters, any two of the at least two transmission parameters are different, the at least two transmission parameters and the correspondence between the identification information of the at least two communication apparatuses and the at least two transmission parameters are used to determine a first transmission parameter, and the first transmission parameter is used to determine a first transmission resource for a first reference signal; and the first network apparatus sends the first configuration information to a first communication apparatus. The first network apparatus may be replaced with a third terminal apparatus.

In embodiments of this application, different terminal apparatuses determine the first transmission parameter in the at least two transmission parameters. However, any two of the at least two transmission parameters are different. In this case, the different terminal apparatuses transmit reference signals based on the different transmission parameters, so that conflicts between the reference signals of the different terminal apparatuses can be reduced, and accuracy of channel estimation can be improved.

In a possible design, the correspondence between the identification information of the at least two communication apparatuses and the at least two transmission parameters is predefined in a protocol, and the first communication apparatus receives third configuration information from the first network apparatus, where the third configuration information indicates the at least two transmission parameters.

Alternatively, the correspondence between the identification information of the at least two communication apparatuses and the at least two transmission parameters is predefined in a protocol, and the first communication apparatus receives fourth configuration information from a third communication apparatus, where the second configuration information indicates the at least two transmission parameters. Therefore, flexibility of transmission parameter configuration can be improved.

In a possible design, an identifier of one communication apparatus of the at least two communication apparatuses includes M bits, the identification information of the communication apparatus of the at least two communication apparatuses includes N bits of the identifier of the communication apparatus of the at least two communication apparatuses, the N bits belong to the M bits, and both M and N are positive integers. The identification information of the first communication apparatus is used to determine the transmission parameter used to transmit the reference signal, so that system design complexity is reduced.

In a possible design, the first configuration information is further used to indicate a second transmission resource, a resource other than the first transmission resource in the second transmission resource is used to transmit first sidelink control information, and the second transmission resource includes the first transmission resource.

In a possible design, the first sidelink control information includes M−N bits other than the N bits in the identifier of the communication apparatus of the at least two communication apparatuses. Therefore, an information amount of the control information can be reduced.

In a possible design, the first sidelink control information is carried on a first sidelink control channel, and the first reference signal is used for channel estimation on the first sidelink control channel.

In a possible design, that the first transmission parameter is used to determine a first transmission resource for a first reference signal includes: The first transmission parameter is used to determine a transmission pattern for the first reference signal, where the transmission pattern is used to determine the first transmission resource.

In a possible design, the first transmission parameter includes a resource offset, and the resource offset is used to determine a start location or the transmission pattern of the transmission resource for the first reference signal.

In a possible design, the first transmission resource includes at least two sub-resources, each of the at least two sub-resources is used to transmit the first reference signal, and the at least two sub-resources are frequency division multiplexed. Optionally, the at least two sub-resources may alternatively be time division multiplexed.

According to a third aspect, a first communication apparatus is provided. The apparatus includes: a processing unit, configured to determine a first transmission parameter in at least two transmission parameters, where any two of the at least two transmission parameters are different, and the first transmission parameter is used to determine a first transmission resource for a first reference signal; and a transceiver unit, configured to send the first reference signal to a second communication apparatus on the first transmission resource. The first communication apparatus may be a first terminal apparatus.

In embodiments of this application, different terminal apparatuses determine the first transmission parameter in the at least two transmission parameters. However, any two of the at least two transmission parameters are different. In this case, the different terminal apparatuses transmit reference signals based on the different transmission parameters, so that conflicts between the reference signals of the different terminal apparatuses can be reduced, and accuracy of channel estimation can be improved.

In a possible design, that a processing unit is configured to determine a first transmission parameter in at least two transmission parameters includes: The processing unit is configured to determine the first transmission parameter in the at least two transmission parameters based on identification information of the first communication apparatus and a correspondence between identification information of at least two communication apparatuses and the at least two transmission parameters.

In a possible design, the at least two transmission parameters and the correspondence between the identification information of the at least two communication apparatuses and the at least two transmission parameters are predefined in a protocol; the transceiver unit is further configured to receive first configuration information from a first network apparatus, where the first configuration information indicates the at least two transmission parameters and the correspondence between the identification information of the at least two communication apparatuses and the at least two transmission parameters; or the transceiver unit is further configured to receive second configuration information from a third communication apparatus, where the second configuration information indicates the at least two transmission parameters and the correspondence between the identification information of the communication apparatuses and the transmission parameters. Alternatively, the correspondence between the identification information of the at least two communication apparatuses and the at least two transmission parameters is predefined in a protocol, and the first communication apparatus receives third configuration information from a first network apparatus, where the third configuration information indicates the at least two transmission parameters. Alternatively, the correspondence between the identification information of the at least two communication apparatuses and the at least two transmission parameters is predefined in a protocol, and the first communication apparatus receives fourth configuration information from a third communication apparatus, where the second configuration information indicates the at least two transmission parameters. Therefore, flexibility of transmission parameter configuration can be improved.

In a possible design, an identifier of the first communication apparatus includes M bits, the identification information of the first communication apparatus includes N bits of the identifier of the first communication apparatus, the N bits belong to the M bits, and both M and N are positive integers. The identification information of the first communication apparatus is used to determine the transmission parameter used to transmit the reference signal, so that system design complexity is reduced.

In a possible design, the transceiver unit is further configured to send first sidelink control information to the second communication apparatus on a resource other than the first transmission resource in a second transmission resource, where the second transmission resource includes the first transmission resource.

In a possible design, the first sidelink control information includes M−N bits other than the N bits in the identifier of the first communication apparatus. Therefore, an information amount of the control information can be reduced.

In a possible design, the first sidelink control information is carried on a first sidelink control channel, and the first reference signal is used for channel estimation on the first sidelink control channel.

In a possible design, that the first transmission parameter is used to determine a first transmission resource for a first reference signal includes: The first transmission parameter is used to determine a transmission pattern for the first reference signal, where the transmission pattern is used to determine the first transmission resource.

In a possible design, the first transmission parameter includes a resource offset, and the resource offset is used to determine a start location or the transmission pattern of the transmission resource for the first reference signal.

In a possible design, the first transmission resource includes at least two sub-resources, each of the at least two sub-resources is used to transmit the first reference signal, and the at least two sub-resources are frequency division multiplexed. Optionally, the at least two sub-resources may alternatively be time division multiplexed.

According to a fourth aspect, a first network apparatus is provided. The apparatus includes: a processing unit, configured to determine first configuration information, where the first configuration information is used to indicate at least two transmission parameters and a correspondence between identification information of at least two communication apparatuses and the at least two transmission parameters, any two of the at least two transmission parameters are different, the at least two transmission parameters and the correspondence between the identification information of the at least two communication apparatuses and the at least two transmission parameters are used to determine a first transmission parameter, and the first transmission parameter is used to determine a first transmission resource for a first reference signal; and a transceiver unit, configured to send the first configuration information to a first communication apparatus. The first network apparatus may be replaced with a third terminal apparatus.

In embodiments of this application, different terminal apparatuses determine the first transmission parameter in the at least two transmission parameters. However, any two of the at least two transmission parameters are different. In this case, the different terminal apparatuses transmit reference signals based on the different transmission parameters, so that conflicts between the reference signals of the different terminal apparatuses can be reduced, and accuracy of channel estimation can be improved.

In a possible design, the correspondence between the identification information of the at least two communication apparatuses and the at least two transmission parameters is predefined in a protocol, and the first communication apparatus receives third configuration information from the first network apparatus, where the third configuration information indicates the at least two transmission parameters. Alternatively, the correspondence between the identification information of the at least two communication apparatuses and the at least two transmission parameters is predefined in a protocol, and the first communication apparatus receives fourth configuration information from a third communication apparatus, where the second configuration information indicates the at least two transmission parameters. Therefore, flexibility of transmission parameter configuration can be improved.

In a possible design, an identifier of one communication apparatus of the at least two communication apparatuses includes M bits, the identification information of the communication apparatus of the at least two communication apparatuses includes N bits of the identifier of the communication apparatus of the at least two communication apparatuses, the N bits belong to the M bits, and both M and N are positive integers. The identification information of the first communication apparatus is used to determine the transmission parameter used to transmit the reference signal, so that system design complexity is reduced.

In a possible design, the first configuration information is further used to indicate a second transmission resource, a resource other than the first transmission resource in the second transmission resource is used to transmit first sidelink control information, and the second transmission resource includes the first transmission resource.

In a possible design, the first sidelink control information includes M–N bits other than the N bits in the identifier of the communication apparatus of the at least two communication apparatuses. Therefore, an information amount of the control information can be reduced.

In a possible design, the first sidelink control information is carried on a first sidelink control channel, and the first reference signal is used for channel estimation on the first sidelink control channel.

In a possible design, that the first transmission parameter is used to determine a first transmission resource for a first reference signal includes: The first transmission parameter is used to determine a transmission pattern for the first reference signal, where the transmission pattern is used to determine the first transmission resource.

In a possible design, the first transmission parameter includes a resource offset, and the resource offset is used to determine a start location or the transmission pattern of the transmission resource for the first reference signal.

In a possible design, the first transmission resource includes at least two sub-resources, each of the at least two sub-resources is used to transmit the first reference signal, and the at least two sub-resources are frequency division multiplexed. Optionally, the at least two sub-resources may alternatively be time division multiplexed.

According to a fifth aspect, a computer-readable storage medium is provided. The computer-readable storage medium stores a computer program. When the computer program runs on a computer, the computer is enabled to perform the method according to any one of the foregoing aspects.

According to a sixth aspect, a communication apparatus is provided. The communication apparatus includes at least one processor, where the at least one processor is coupled to a memory, the memory may be built in the communication apparatus, or may be disposed outside the communication apparatus, and the at least one processor is configured to invoke instructions from the memory and run the instructions, so that the communication apparatus implements the method according to any one of the foregoing aspects. The communication apparatus may be a chip.

According to a seventh aspect, a chip is provided. The chip includes at least one processor, where the at least one processor is coupled to a memory, the memory may be built in the chip, or may be disposed outside the chip, and the at least one processor is configured to invoke instructions from the memory and run the instructions, so that the chip implements the method according to any one of the foregoing aspects.

According to an eighth aspect, a computer program product is provided. The computer program product includes a computer program. When the computer program runs on a computer, the computer is enabled to perform the method according to any one of the foregoing aspects.

According to a ninth aspect, a communication apparatus is provided. The apparatus includes at least one processor and an interface circuit, where the interface circuit is configured to: receive computer code or instructions, and transmit the computer code or the instructions to the processor, and the processor is configured to run the computer code or the instructions to perform the method according to any one of the foregoing aspects.

According to a tenth aspect, a system is provided. The system includes the apparatus according to the third aspect and the apparatus according to the fourth aspect.

DESCRIPTION OF EMBODIMENTS

The following describes technical solutions of this application with reference to accompanying drawings.

The technical solutions of this application may be applied to any terminal device-to-terminal device (device-to-device, D2D) direct communication network, such as a vehicle-to-everything (V2X) communication system, a V2V communication system, a V2I communication system, a V2P communication system, a V2N communication system, an intelligent connected vehicle (ICV) communication system, an autonomous driving communication system, or an assisted driving communication system, and applied to user equipment cooperation (UE Cooperation, UC) or sidelink relaying. In addition, the technical solutions are applicable to a communication scenario with network coverage and a communication scenario without network coverage.

Figure 1:
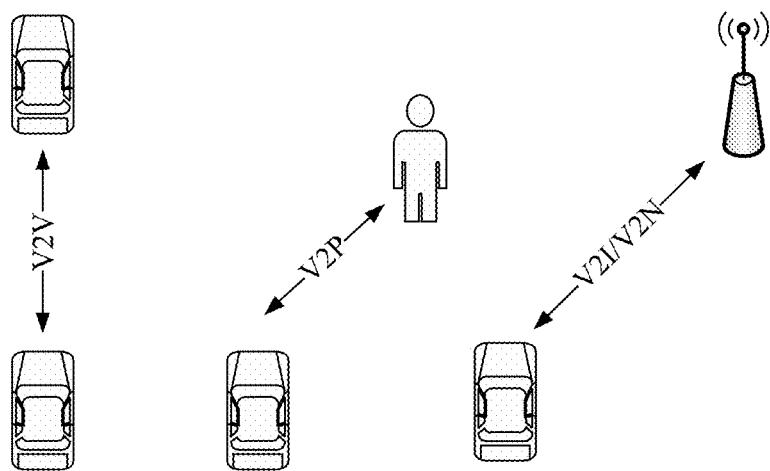
FIG. 1 is a schematic diagram of a V2X communication scenario.

FIG. 1 is a schematic diagram of a V2X communication scenario. In V2X communication, a link between vehicle-user equipments (V-UEs), between pedestrian user equipment and vehicle-user equipment, or between roadside unit (RSU) devices is referred to as a sidelink (SL). A link between vehicle-user equipment and a network device is referred to as a downlink (DL) or an uplink (UL), an air interface of the link is also referred to as a Uu air interface, and corresponding DL communication and UL communication are also referred to as Uu communication.

A terminal device in this application may also be referred to as a terminal apparatus, and includes but is not limited to user equipment (UE), a wireless terminal device, a mobile terminal device, a device-to-device (D2D) communication terminal device, a V2X terminal device, a machine type communication (M2M/MTC) terminal device, an internet of things (IoT) terminal device, a user terminal, a user agent, a user device, or the like. For example, the terminal device may include a mobile phone (or referred to as a "cellular" phone), or a computer having a mobile terminal device, for example, a portable, pocket-sized, handheld, or computer built-in mobile apparatus. For another example, the terminal device may include a device such as a personal communications service (PCS) phone, a cordless phone, a session initiation protocol (SIP) phone, a wireless local loop (WLL) station, or a personal digital assistant (PDA). In addition, the terminal device may alternatively be a vehicle-mounted communication module or another embedded communication module. The vehicle-mounted communication module may also be referred to as a vehicle-mounted terminal device or an on-board unit (OBU). The terminal device in embodiments of this application may alternatively be a vehicle-mounted module, a vehicle-mounted component, a vehicle-mounted chip, or a vehicle-mounted unit that is built in a vehicle as one or more components or units. The vehicle may implement a method in this application by using the built-in vehicle-mounted module, vehicle-mounted component, vehicle-mounted chip, or vehicle-mounted unit.

A network device in this application includes, for example, an access network (AN) device, for example, a base station (for example, an access point), and may be a device that communicates with a wireless terminal device over an air interface via one or more cells in an access network. Alternatively, for example, a network device in a vehicle-to-everything (V2X) technology is a road side unit (RSU). The base station may be configured to perform mutual conversion between a received over-the-air frame and an IP packet, to serve as a router between a terminal device and a remaining part of the access network, where the remaining part of the access network may include an IP network. The RSU may be a fixed infrastructure entity supporting a V2X application, and may exchange a message with another entity supporting the V2X application. The network device may further coordinate attribute management of the air interface. For example, the network device may include an evolved NodeB (eNB, or e-NodeB, evolved NodeB) in a long term evolution (LTE) system or a long term evolution-advanced (LTE-A) system, may include a next generation NodeB (gNB) in a 5th generation mobile communication technology (5th generation, 5G) new radio (NR) system (which is also referred to as an NR system for short), or may include a centralized unit (CU) and a distributed unit (DU) in a cloud radio access network (Cloud RAN) system. This is not limited in embodiments of this application.

Certainly, the network device may further include a core network device. However, because the technical solutions provided in embodiments of this application mainly relate to an access network device, unless otherwise specified in the following descriptions, the described "core network device" refers to the core network device, and the described "network device" or "access network device" refers to the access network device.

The following defines some words in this application.

Transmission parameter: The transmission parameter in embodiments of this application may be used to determine a transmission resource for a reference signal, and the transmission resource may be a frequency domain resource and/or a time domain resource. Preferably, the transmission parameter is used to determine the frequency domain transmission resource for the reference signal. In this case, the time domain transmission resource for the reference signal occupies an entire time domain range of a control channel. Further, the transmission parameter may be further used to determine another parameter related to transmission of the reference signal, for example, a transmission periodicity of the reference signal.

Reference signal: The reference signal in embodiments of this application includes a demodulation reference signal (DMRS), a cell-specific reference signal (CRS), and/or a channel state information-reference signal (CSI-RS). The demodulation reference signal is used to demodulate sidelink control information or sidelink data.

Identification information: The identification information in embodiments of this application may be an identifier of a communication apparatus or an identifier of a terminal apparatus; or may be a part of an identifier of a communication apparatus or an identifier of a terminal apparatus. If the identifier of the communication apparatus or the identifier of the terminal apparatus is an identifier of M bits, the identification information may be the identifier of the M bits, or may be N bits of the M bits, where the N bits may be N least significant bits, N most significant bits, or any N bits. For example, if the identifier of the communication apparatus or the identifier of the terminal apparatus is an identifier of 5 bits (10101), the identification information of the communication apparatus or the terminal apparatus may be 2 least significant bits (01) of the 5 bits.

Transmission pattern: The transmission pattern in embodiments of this application may be an example of resource patterning, and is used to determine a specific resource for reference signal transmission. The transmission pattern may include indication information of n bits, to indicate whether n resource units corresponding to the n bits are used to transmit a reference signal. For one bit, "1" indicates that the bit is used to transmit a reference signal, and "0" indicates that the bit is not used to transmit the reference signal. For example, the transmission pattern is indication information of 5 bits (10100), and the transmission pattern of the 5 bits is used to determine whether five resource units (for example, resource blocks (RBs) or resource elements (REs)) in frequency domain are used to transmit a reference signal. In this case, the transmission pattern (10100) indicates that the first resource unit and the third resource unit are used to transmit the reference signal, and the second resource unit, the fourth resource unit, and the fifth resource unit are not used to transmit the reference signal.

Figure 2:
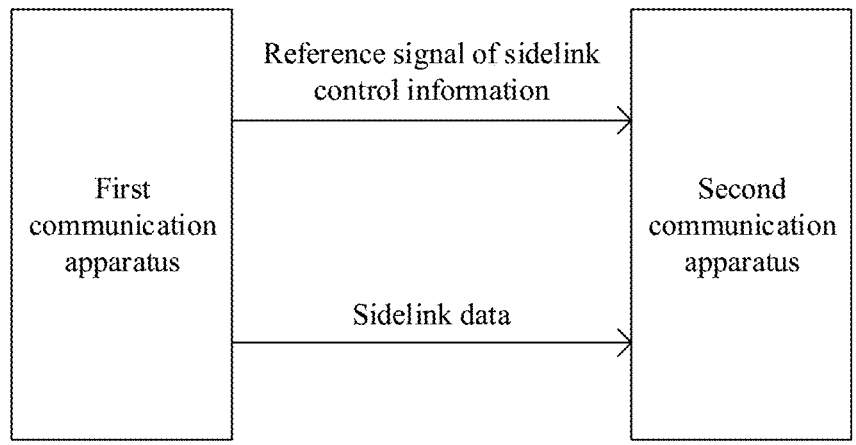
FIG. 2 is a schematic diagram of sidelink communication according to this application.

FIG. 2 shows a reference signal transmission method according to an embodiment of this application. A first communication apparatus sends sidelink control information to a second communication apparatus on a first resource on a physical sidelink control channel, and a part of the first resource is used by the first communication apparatus to send a reference signal to the second communication apparatus. The second communication apparatus measures the reference signal, that is, performs channel estimation, to determine a channel state of the sidelink control channel. The second communication apparatus demodulates the received sidelink control information based on a channel estimation result (a measurement result of the reference signal). The sidelink control information includes a resource used by the first communication apparatus to send sidelink data and a parameter, for example, a modulation and coding scheme (MCS). After receiving the sidelink control information, the second communication apparatus decodes the sidelink control information, to obtain the transmission resource for the sidelink data and the parameter, for example, the modulation and coding scheme, and receives the sidelink data on a physical sidelink data channel based on the transmission resource for the sidelink data and the parameter, for example, the modulation and coding scheme, that are indicated by the sidelink control information. In embodiments of this application, the first communication apparatus may be a first terminal apparatus, and the second communication apparatus may be a second terminal apparatus.

The following describes embodiments of this application in more detail by using a first terminal apparatus to a third terminal apparatus and a network apparatus as examples.

Figure 3:
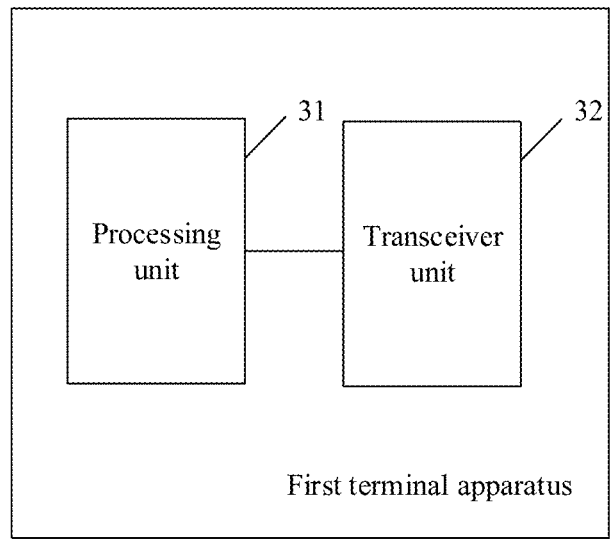
FIG. 3 is a schematic diagram of a structure of a first terminal apparatus according to this application.
Figure 4:
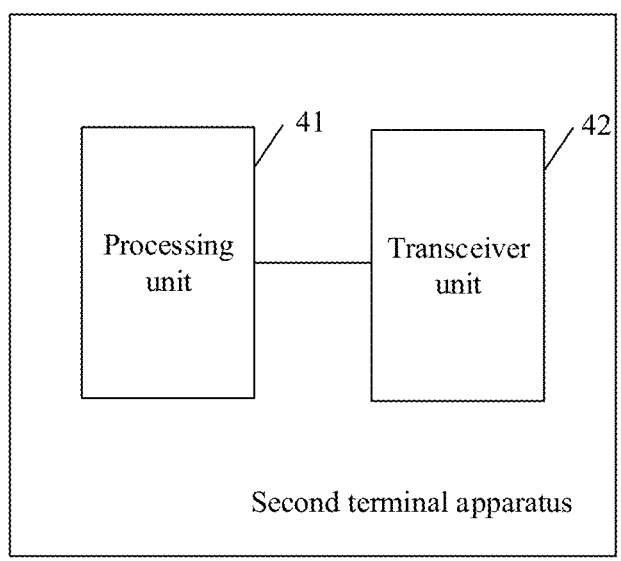
FIG. 4 is a schematic diagram of a structure of a second terminal apparatus according to this application.
Figure 5:
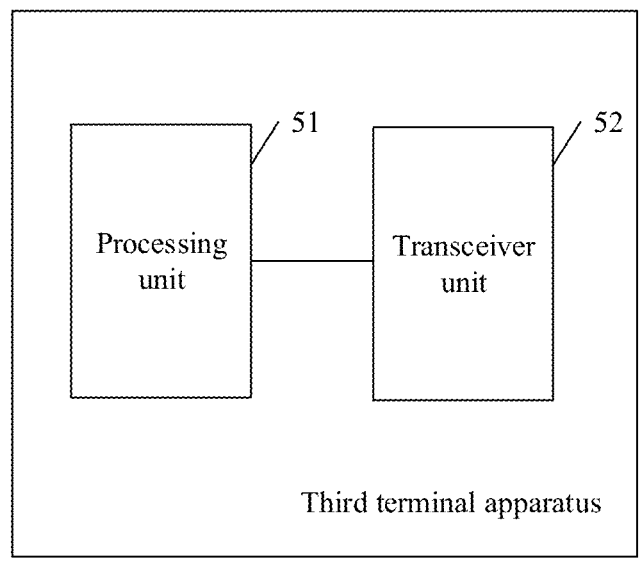
FIG. 5 is a schematic diagram of a structure of a third terminal apparatus according to this application.
Figure 6:
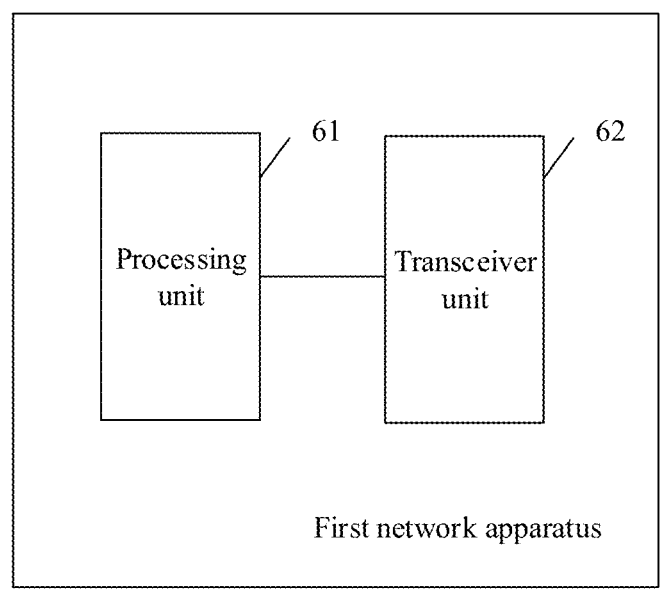
FIG. 6 is a schematic diagram of a structure of a first network apparatus according to this application.
Figure 7:
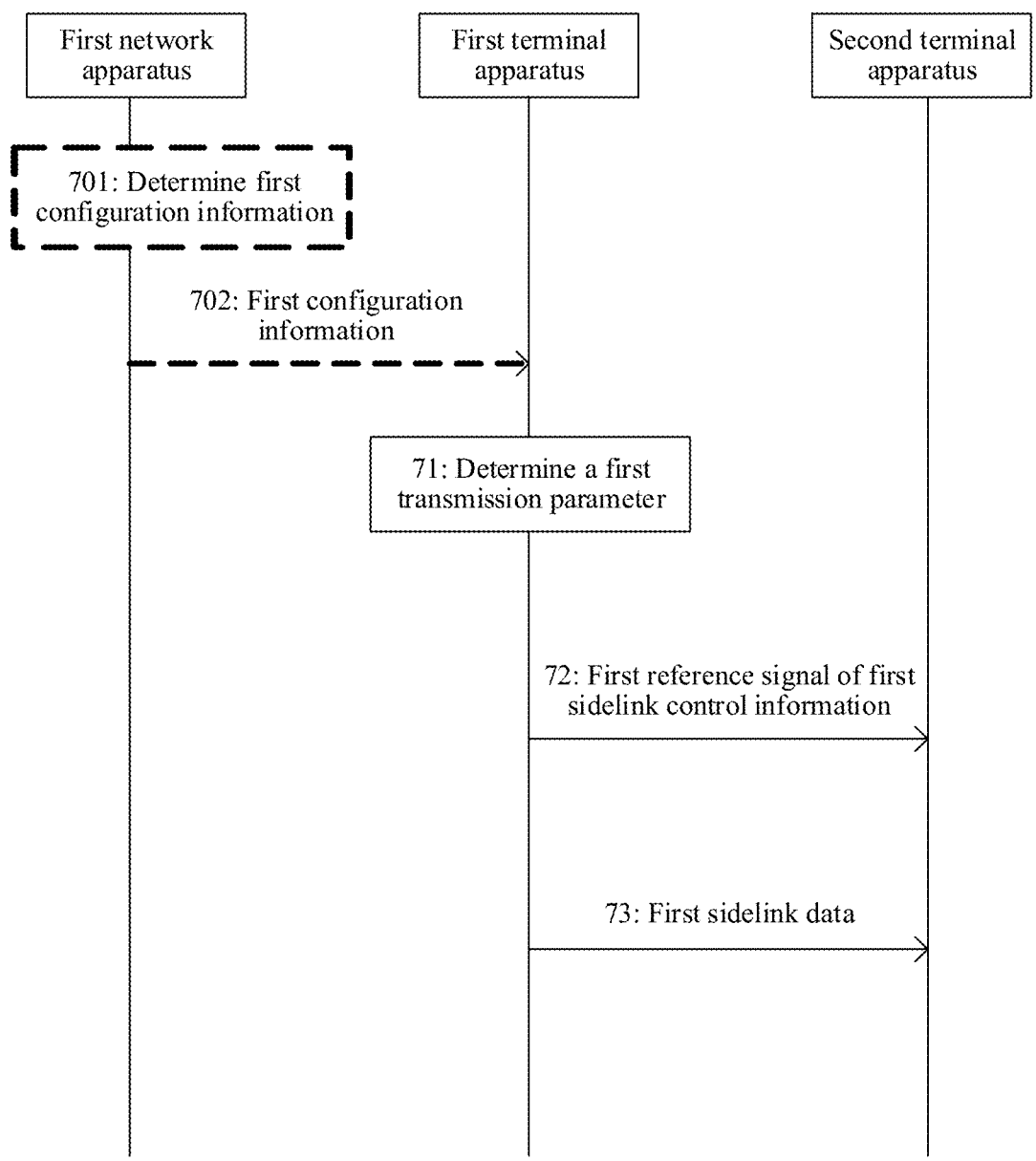
FIG. 7 is a schematic flowchart of a reference signal transmission method according to this application.

FIG. 7 shows a reference signal transmission method, a first terminal apparatus to a third terminal apparatus, a network apparatus, and a system according to an embodiment of this application. As shown in FIG. 3, the first terminal apparatus includes a processing unit 31 and a transceiver unit 32. The transceiver unit 32 may be replaced with a sending unit or a receiving unit. As shown in FIG. 4, the second terminal apparatus includes a processing unit 41 and a transceiver unit 42. The transceiver unit 42 may be replaced with a sending unit or a receiving unit. As shown in FIG. 5, the third terminal apparatus includes a processing unit 51 and a transceiver unit 52. The transceiver unit 52 may be replaced with a sending unit or a receiving unit. As shown in FIG. 6, a first network apparatus includes a processing unit 61 and a transceiver unit 62. The transceiver unit 62 may be replaced with a sending unit or a receiving unit.

The first terminal apparatus to the third terminal apparatus may be vehicle-mounted modules or user equipments, and the first network apparatus may be a base station. The processing unit 31, the processing unit 41, the processing unit 51, and the processing unit 61 may be processors. The transceiver unit 32, the transceiver unit 42, the transceiver unit 52, and the transceiver unit 62 may be transceivers. The transceiver unit 32, the transceiver unit 42, the transceiver unit 52, and the transceiver unit 62 may be receivers when performing receiving steps. The transceiver unit 32, the transceiver unit 42, the transceiver unit 52, and the transceiver unit 62 may be transmitters when performing sending steps. The transceiver, the transmitter, or the receiver may be a radio frequency circuit or a radio frequency front-end. When the first terminal apparatus, the second terminal apparatus, or the network apparatus includes a storage unit, the storage unit is configured to store computer instructions. The processor and the memory are in communication connection, and the processor executes the computer instructions stored in the memory, so that the first terminal apparatus, the second terminal apparatus, or the network apparatus performs the method in the embodiment in FIG. 7. The processor may be a general-purpose central processing unit (CPU), a microprocessor, or an application-specific integrated circuit (ASIC).

When the first terminal apparatus, the second terminal apparatus, the third terminal apparatus, or the first network apparatus is a chip, the processing unit 31, the processing unit 41, the processing unit 51, and the processing unit 61 may be processors, and the transceiver unit 32, the transceiver unit 42, the transceiver unit 52, and the transceiver unit 62 may be input interfaces or output interfaces, pins, circuits, or the like. The processing unit may execute a program or instructions stored in a storage unit or a memory, so that the chip in the first terminal apparatus, the second terminal apparatus, or the network apparatus performs the method in FIG. 7. Optionally, the storage unit or the memory is a storage unit, for example, a register or a buffer, in the chip; or the storage unit or the memory may be a storage unit in the terminal but outside the chip, for example, a read-only memory (ROM), another type of static storage device capable of storing static information and instructions, or a random access memory (RAM).

It should be noted that the first terminal apparatus in the following descriptions may be a transmit end device in sidelink communication or may be a circuit system, for example, a chip or an integrated circuit, installed in the transmit end device. The second terminal apparatus may be a receive end device in the sidelink communication or may be a circuit system, for example, a chip or an integrated circuit, installed in the receive end device. The terminal apparatus in this application may be a communication apparatus.

Optionally, the chip described herein may be, for example, a system on a chip (system on chip, SoC) or a baseband chip.

The reference signal transmission method in the embodiment in FIG. 7 includes the following steps.

Step 71: The processing unit 31 of the first terminal apparatus determines a first transmission parameter in at least two transmission parameters, where any two of the at least two transmission parameters are different, and the first transmission parameter is used to determine a first transmission resource for a first reference signal. The first transmission parameter belongs to the at least two transmission parameters, and any one of the at least two transmission parameters is different from another one of the at least two transmission parameters. Preferably, the first reference signal is a demodulation reference signal, and is used for channel estimation on a sidelink control channel.

Any one of the at least two transmission parameters includes a resource offset, and the resource offset is used to determine a start location or a transmission pattern, in a resource cluster, of a transmission resource for a reference signal transmitted based on the transmission parameter, where the start location or the transmission pattern may be used to determine the transmission resource in the resource cluster for the reference signal. For example, the first transmission parameter is a transmission parameter determined by the first terminal apparatus in the at least two transmission parameters. In this case, the first transmission parameter includes a resource offset, and the resource offset is used to determine a start location or a transmission pattern, in a resource cluster, of the transmission resource for the first reference signal. The resource cluster is a set of resource units, and the resource cluster may be predefined in a protocol or configured by the network apparatus.

The processing unit 31 of the first terminal apparatus may specifically determine the first transmission parameter in the at least two transmission parameters in two manners. Manner 1: The processing unit 31 of the first communication apparatus may determine the first transmission parameter in the at least two transmission parameters based on identification information of the first terminal apparatus and a correspondence between identification information of at least two terminal apparatuses and the at least two transmission parameters. Manner 2: Alternatively, the processing unit 31 of the first communication apparatus may randomly select or freely select the first transmission parameter from the at least two transmission parameters.

In the manner 1, the correspondence between the identification information of the at least two terminal apparatuses and the at least two transmission parameters may be referred to as a correspondence between identification information of terminal apparatuses and transmission parameters. The correspondence preferably means that the identification information of the terminal apparatuses and the transmission parameters have a correspondence, for example, may be in a one-to-one correspondence, or may be in a many-to-one correspondence. To be specific, the first terminal apparatus may determine a transmission parameter in the foregoing correspondence based on the identification information of the first terminal apparatus. For example, as shown in Table 1, there are four transmission parameters 1 to 4, identification information 00 of a terminal apparatus corresponds to the transmission parameter 1, identification information 01 of a terminal apparatus corresponds to the transmission parameter 2, identification information 10 of the terminal apparatus corresponds to the transmission parameter 3, and identification information 11 of the terminal apparatus corresponds to the transmission parameter 4. Certainly, Table 1 provides a one-to-one correspondence. If there is a many-to-one correspondence, the identification information 00 and 01 may correspond to the transmission parameter 1, and the identification information 10 and 11 may correspond to the transmission parameter 2.

TABLE 1

| Identification information of a terminal apparatus | Transmission parameter |
|---|---|
| 00 | Transmission parameter 1 |
| 01 | Transmission parameter 2 |
| 10 | Transmission parameter 3 |
| 11 | Transmission parameter 4 |

An identifier of the first terminal apparatus includes M bits, the identification information of the first terminal apparatus includes N bits of the identifier of the first terminal apparatus, the N bits belong to the M bits, and both M and N are positive integers. For example, the M (6)-bit identifier of the first terminal apparatus is 101101, and the identification information of the first terminal apparatus may be, for example, specified in a protocol or configured as least significant N (2) bits by the network apparatus or the third terminal apparatus. In this case, the identification information of the first terminal apparatus is 01, and the processing unit 31 of the first terminal apparatus determines, by querying Table 1 (that is, querying the correspondence in Table 1) based on the identification information 01 of the first terminal apparatus, the transmission parameter 2 as a transmission parameter, namely, the first transmission parameter, used by the first terminal apparatus to send the first reference signal. The identifier of the terminal apparatus may be a physical layer identifier, or may be a higher layer identifier, for example, a cell radio network temporary identifier (C-RNTI). The identification information of the terminal apparatus may be a part of the physical layer identifier, or may be a part of the higher layer identifier, for example, a part of the C-RNTI.

The identification information of the terminal apparatus in Table 1 is not identification information of a specific terminal apparatus. A terminal apparatus needs to search for a corresponding transmission parameter by using the correspondence in Table 1 based on identification information of the terminal apparatus. That the identification information of the terminal apparatus in Table 1 is 2 bits is merely an example. Specifically, a quantity of bits included in the identification information of the terminal apparatus and bits, in the M bits, that are used as the identification information of the N bits, that is, a value of N and whether N is least significant N bits, most significant N bits, or middle N bits may be predefined in a protocol or configured by the network apparatus or the third terminal apparatus.

In the manner 1, the at least two transmission parameters and/or the correspondence between the identification information of the at least two terminal apparatuses and the at least two transmission parameters may be predefined in a protocol or preset. In the manner 2, the at least two transmission parameters may be predefined in a protocol or preset. That is, the processing unit 31 of the first terminal apparatus determines, based on the at least two transmission parameters and/or the correspondence between the identification information of the at least two terminal apparatuses and the at least two transmission parameters that are/is predefined in a protocol or preset, the first transmission parameter corresponding to the first terminal apparatus. The first transmission parameter belongs to the at least two transmission parameters.

Optionally, in the manner 1, the correspondence between the identification information of the at least two communication apparatuses and the at least two transmission parameters is predefined in a protocol, and the first communication apparatus receives third configuration information from the first network apparatus, where the third configuration information indicates the at least two transmission parameters. Alternatively, the correspondence between the identification information of the at least two communication apparatuses and the at least two transmission parameters is predefined in a protocol, and the first communication apparatus receives fourth configuration information from a third communication apparatus, where the second configuration information indicates the at least two transmission parameters. That is, the correspondence between the identification information of the at least two communication apparatuses and the at least two transmission parameters is predefined in a protocol, and the at least two transmission parameters are configured by the first network apparatus or the third terminal apparatus for the first terminal apparatus.

The at least two transmission parameters and/or the correspondence between the identification information of the at least two terminal apparatuses and the at least two transmission parameters in the manner 1 may alternatively be configured by the first network apparatus or the third terminal apparatus, and the at least two transmission parameters in the manner 2 may alternatively be configured by the first network apparatus or the third terminal apparatus. The configuration step may specifically include step 701 and step 702 before step 71. In FIG. 7, only an example in which the first network apparatus configures first configuration information is used for description, and the first network apparatus in FIG. 7 may be replaced with the third terminal apparatus.

Step 701: The processing unit 61 of the first network apparatus determines the first configuration information. Manner 1: The first configuration information is used to indicate the at least two transmission parameters and/or the correspondence between the identification information of the at least two communication apparatuses and the at least two transmission parameters, any two of the at least two transmission parameters are different, the at least two transmission parameters and the correspondence between the identification information of the at least two communication apparatuses and the at least two transmission parameters are used to determine the first transmission parameter, and the first transmission parameter is used to determine the first transmission resource for the first reference signal. In the manner 2, the first configuration information is used to indicate the at least two transmission parameters.

Step 702: The transceiver unit 62 of the first network apparatus sends the first configuration information to the first terminal apparatus, and the transceiver unit 32 of the first terminal apparatus receives the first configuration information from the first network apparatus. In step 701 and step 702, the network apparatus or the third terminal apparatus can more flexibly configure the transmission parameter for the reference signal, to improve flexibility of transmission of the reference signal. The network apparatus or the third terminal apparatus can dynamically or semi-statically schedule resources used by different terminal apparatuses to transmit reference signals, so that a conflict is avoided and accuracy of channel estimation is improved.

Step 72: The transceiver unit 32 of the first terminal apparatus sends the first reference signal to the second terminal apparatus on the first transmission resource, and the transceiver unit 42 of the second terminal apparatus receives the first reference signal from the first terminal apparatus on the first transmission resource. When sending the first reference signal, the transceiver unit 32 of the first terminal apparatus also sends first sidelink control information to the second terminal apparatus.

In the example of Table 1, the at least two transmission parameters are the four transmission parameters, namely, the transmission parameter 1, the transmission parameter 2, the transmission parameter 3, and the transmission parameter 4. The transmission parameter includes a resource offset, and the resource offset may be a difference between a start transmission resource unit for a reference signal in a resource cluster and a resource unit with a smallest sequence number in the resource cluster. For example, the transmission parameter 1 indicates that a resource offset is zero resource unit, the transmission parameter 2 indicates that a resource offset is one resource unit, the transmission parameter 3 indicates that a resource offset is two resource units, and the transmission parameter 4 indicates that a resource offset is three resource units. The resource cluster is a set of resource units. The resource unit may be a frequency domain resource unit at any granularity. For example, the resource unit may be a resource element (RE), the resource unit may be a resource block (RB), or the resource unit may be a time domain resource unit at any granularity. The resource cluster is a set of resource units. For example, the resource unit may be a symbol, and the resource cluster may be a slot.

Figure 8:
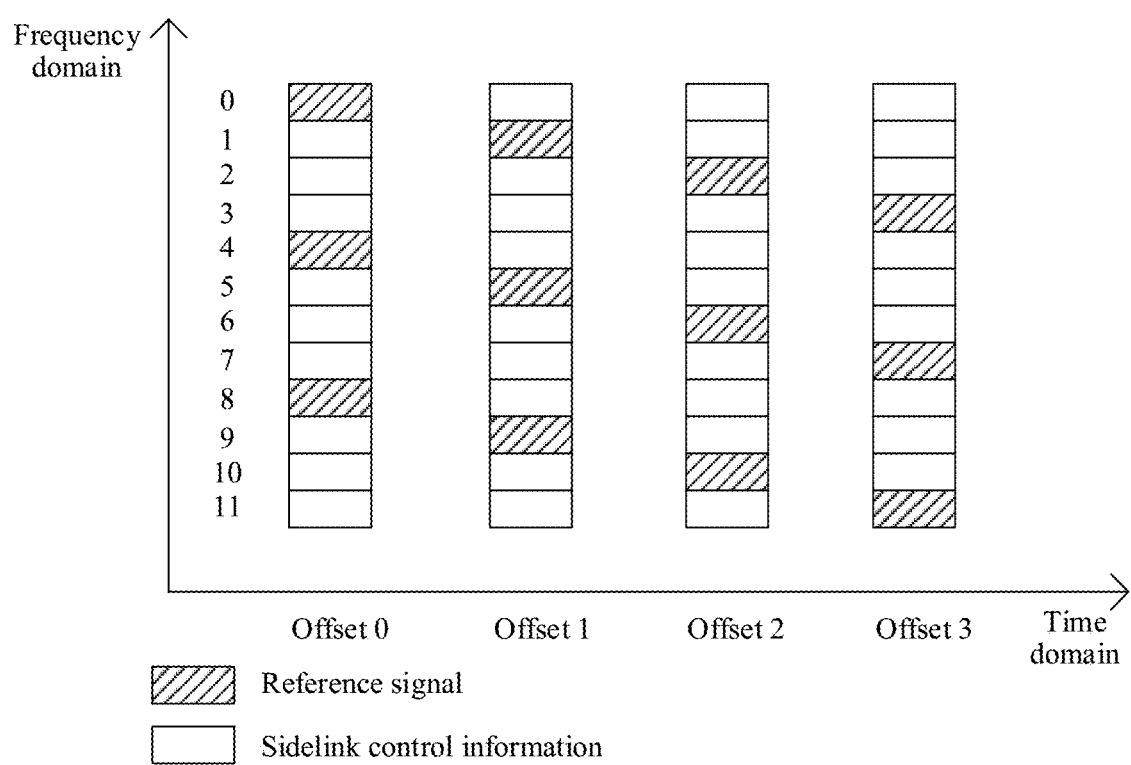
FIG. 8 is a schematic diagram of transmission resources for reference signals according to this application.

In FIG. 8, the sidelink control channel occupies one resource cluster. A total of 12 resource units from a resource unit 0 to a resource unit 11 included in the resource cluster are used to transmit the sidelink control channel, and the sidelink control information and the reference signal are carried on the sidelink control channel. The resource cluster including the resource unit 0 to the resource unit 11 is selected by the first terminal apparatus from a resource pool; or the resource cluster including the resource unit 0 to the resource unit 11 is selected by the first network apparatus from a resource pool for the first terminal apparatus and indicated to the first terminal apparatus, where the resource pool may be a resource pool predefined in a protocol. The offset 0 indicated by the transmission parameter 1 indicates that a difference between a start transmission resource 0 for the reference signal and a resource unit with a smallest sequence number in the resource cluster, namely, the transmission resource 0, is 0, that is, the two are a same resource 0. The offset 1 indicated by the transmission parameter 2 indicates that a difference between a start transmission resource 1 for the reference signal and a resource unit with a smallest sequence number in the resource cluster, namely, the transmission resource 0, is 1, that is, the two are adjacent resource units. The offset 2 indicated by the transmission parameter 3 indicates that a difference between a start transmission resource 2 for the reference signal and a resource unit with a smallest sequence number in the resource cluster, namely, the transmission resource 0, is 2, that is, the two has a difference of two resource units. The offset 3 indicated by the transmission parameter 4 indicates that a difference between a start transmission resource 3 for the reference signal and a resource unit with a smallest sequence number in the resource cluster, namely, the transmission resource 0, is 3, that is, the two has a difference of three resource units. Optionally, the offset indicated by the transmission parameter may alternatively indicate a difference between a start transmission resource unit, for the reference signal, in the resource cluster and a resource unit with a smallest sequence number in the resource cluster. In FIG. 8, after the start transmission resource for the reference signal is determined, a remaining resource unit used to transmit the reference signal may be determined based on an interval between resource units for transmitting the reference signal. The interval may be predefined in a protocol; or may be configured by the first network apparatus or the third terminal apparatus and indicated to the first terminal apparatus. The transmission parameter (namely, the resource offset) is used to determine the start location or the transmission pattern, in the resource cluster, of the transmission resource for the first reference signal. As shown in FIG. 8, an interval between transmission resources for different reference signal is four resource units. When the first terminal apparatus determines the transmission parameter 2, namely, the offset 1, as the transmission parameter for the reference signal, the first terminal apparatus determines that resources for transmitting the first reference signal are the resource unit 1, the resource unit 5, and the resource unit 9. In this case, the start location of the transmission resource for the first reference signal is the resource unit 1, and the transmission pattern of the transmission resource for the first reference signal is a pattern including the resource unit 1, the resource unit 5, and the resource unit 9. Optionally, the first transmission resource includes at least two sub-resources, each of the at least two sub-resources is used to transmit the first reference signal, and the at least two sub-resources are frequency division multiplexed. For example, the first transmission resource includes the resource unit 1, the resource unit 5, and the resource unit 9, and the resource unit 1, the resource unit 5, and the resource unit 9 are all used by the first terminal apparatus to transmit the first reference signal to the second terminal apparatus. Alternatively, the sidelink control channel may include a plurality of resource clusters. A quantity of resource clusters included on the control channel is not limited herein.

The first terminal apparatus determines, in the four transmission parameters based on step 71, the transmission parameter 2 as the first transmission parameter, that is, the transmission parameter 2 is used as a transmission parameter based on which the first terminal apparatus sends the first reference signal. If another terminal apparatus determines that the transmission parameter 3 is used as a transmission parameter based on which the another terminal apparatus sends a reference signal, resources for sending the reference signals by the first terminal apparatus and the terminal apparatus are different, so that a conflict is avoided. When a quantity of terminal apparatuses exceeds a quantity of the at least two transmission parameters, although at least two terminal apparatuses send reference signals by using a same transmission parameter, that is, a same resource, the reference signals of the terminal apparatuses that use the same transmission parameter cause a conflict, from a perspective of all the terminal apparatuses or from a perspective of the system, conflicts between the transmission resources for the reference signals are reduced in comparison with a case in which all the terminal apparatuses send reference signals by using a same transmission parameter (transmission resource). In this way, the accuracy of the channel estimation based on the reference signal is improved.

The transceiver unit 32 of the first terminal apparatus sends the first sidelink control information to the second terminal apparatus on a resource other than the first transmission resource in the second transmission resource, and the transceiver unit 42 of the second terminal apparatus receives the first sidelink control information from the second terminal apparatus on the resource other than the first transmission resource in the second transmission resource, where the second transmission resource includes the first transmission resource.

The first sidelink control information sent by the first terminal apparatus to the second terminal apparatus includes M–N bits other than the N bits in the identifier of the first communication apparatus. The second terminal apparatus performs blind detection on the first reference signal sent by the first terminal apparatus, and determines, based on the correspondence between the identification information of the at least two communication apparatuses and the at least two transmission parameters, the N bits included in the identification information of the first terminal apparatus, and the second terminal apparatus determines the identifier of the first terminal apparatus, namely, M-bit information based on (M–N)-bit information included in the first sidelink control information and N-bit information.

Step 73: The transceiver unit 32 of the first terminal apparatus sends first sidelink data to the second terminal apparatus based on the first sidelink control information, and the transceiver unit 42 of the second terminal apparatus receives the first sidelink data from the first terminal apparatus based on the first sidelink control information.

Figure 9:
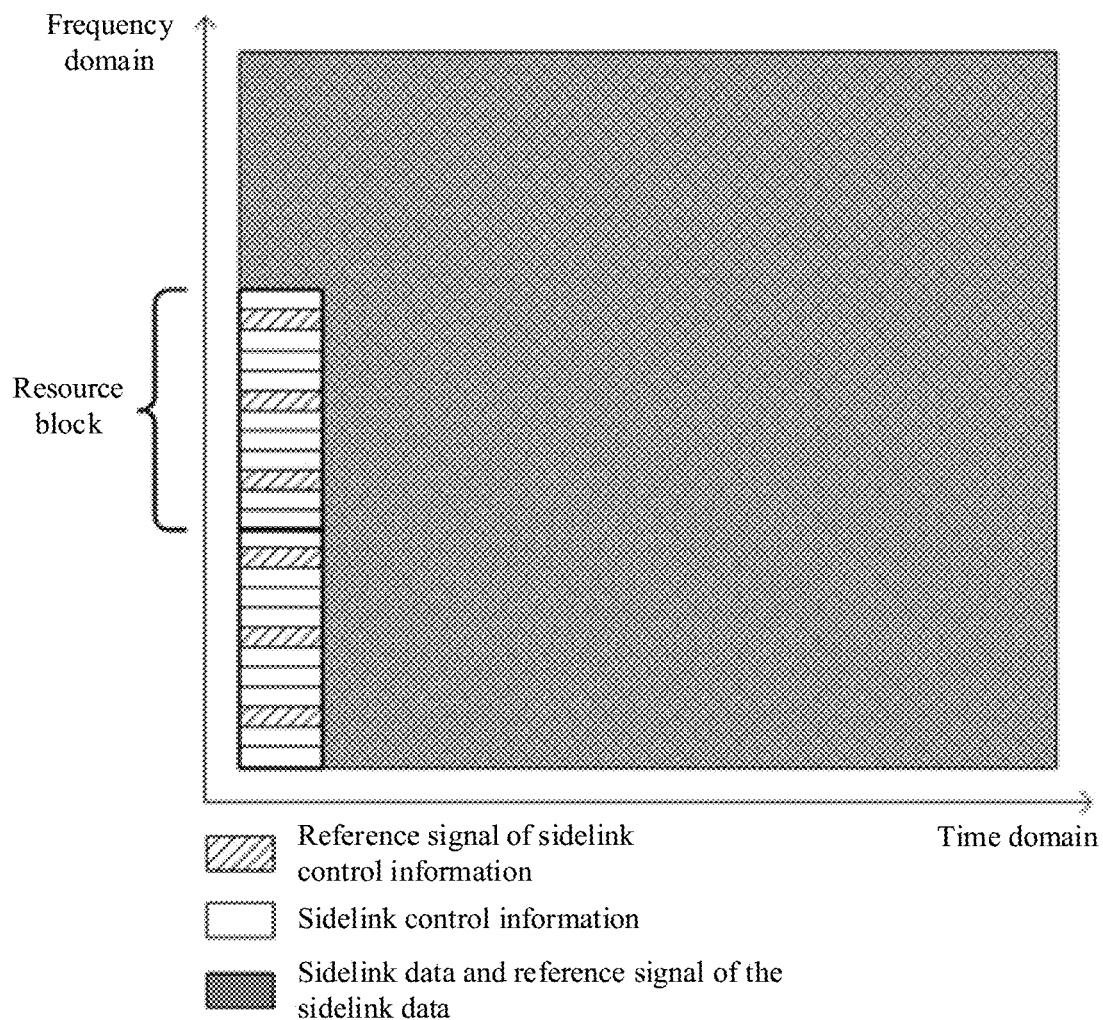
FIG. 9 is a schematic diagram of transmission resources for sidelink control information, a reference signal, and sidelink data according to this application.

Specific resource mapping among the first sidelink control information, the first sidelink data, and the first reference signal that are sent by the first terminal apparatus to the second terminal apparatus is shown in FIG. 9. In this case, the resource unit is one resource element (RE), the resource cluster is one resource block (RB) including 12 resource elements (REs), the resource block is predefined in a protocol, and the sidelink control information includes one or more resource blocks and preferably includes two resource blocks. The sidelink data and a reference signal of the sidelink data are transmitted on a third transmission resource on a physical sidelink data channel, the sidelink control information is transmitted on the second transmission resource on the physical sidelink control channel, the reference signal of the sidelink control information is transmitted on the first transmission resource. The third transmission resource and the second transmission resource are both frequency division multiplexed and time division multiplexed. To be specific, a part of the third transmission resource and the second transmission resource are frequency division multiplexed, and the other part of the third transmission resource and the second transmission resource are time division multiplexed. Certainly, the third transmission resource for transmitting the sidelink data and the second transmission resource for transmitting the sidelink control information may alternatively be frequency division multiplexed or time division multiplexed. The transmission resource for the reference signal is embedded in the transmission resource for the sidelink control information, the second transmission resource may include at least one resource block (RB), the resource block includes at least one resource element (RE), a difference between the first resource element for transmitting the first reference signal in the resource block and the first resource element included in the second transmission resource constitutes the offset or the transmission parameter in this application. The transmission resource for the reference signal is evenly distributed in the transmission resource for the sidelink control information, so that channel estimation is more accurately performed, based on the first reference signal, on the sidelink control channel on which the sidelink control information is located.

In embodiments of this application, different terminal apparatuses determine the first transmission parameter in the at least two transmission parameters. However, any two of the at least two transmission parameters are different. In this case, the different terminal apparatuses transmit reference signals based on the different transmission parameters, so that conflicts between the reference signals of the different terminal apparatuses can be reduced, and accuracy of channel estimation can be improved.

Optionally, the memory and the processor in the foregoing apparatus embodiments may be physically independent units, or the memory may be integrated with the processor.

In addition, this application further provides a computer-readable storage medium. The computer-readable storage medium stores computer instructions. When the computer instructions are executed on a computer, the computer is enabled to perform operations and/or processing performed by the first terminal apparatus in the sidelink control information sending method in this application.

This application further provides a computer-readable storage medium. The computer-readable storage medium stores computer instructions. When the computer instructions are executed on a computer, the computer is enabled to perform operations and/or processing performed by the second terminal apparatus in the sidelink control information sending method in this application.

This application further provides a computer program product. The computer program product includes computer program code. When the computer program code is executed on a computer, the computer is enabled to perform operations and/or processing performed by the first terminal apparatus in the sidelink control information sending method in this application.

This application further provides a computer program product. The computer program product includes computer program code. When the computer program code is executed on a computer, the computer is enabled to perform operations and/or processing performed by the second terminal apparatus in the sidelink control information sending method in this application.

This application further provides a terminal apparatus, including a processor and an interface circuit. The interface circuit is configured to receive computer code or instructions, and transmit the computer code or the instructions to the processor. The processor is configured to execute the computer code or the instructions, to perform operations and/or processing performed by the first terminal apparatus in the sidelink control information sending method in this application.

This application further provides a terminal apparatus, including a processor and an interface circuit. The interface circuit is configured to receive computer code or instructions, and transmit the computer code or the instructions to the processor. The processor is configured to execute the computer code or the instructions, to perform operations and/or processing performed by the second terminal apparatus in the sidelink control information sending method in this application.

This application further provides a chip. The chip includes one or more processors. The one or more processors are configured to execute a computer program stored in a memory, to perform operations and/or processing performed by the first terminal apparatus in any method embodiment. The memory configured to store the computer program is disposed independently of the chip.

Further, the chip may further include one or more communication interfaces. The one or more communication interfaces may be an input/output interface, an input/output circuit, or the like. Further, the chip may further include one or more memories.

This application further provides a chip. The chip includes one or more processors. The one or more processors are configured to execute a computer program stored in a memory, to perform operations and/or processing performed by the second terminal apparatus in any method embodiment. The memory configured to store the computer program is disposed independently of the chip.

Further, the chip may further include one or more communication interfaces. The one or more communication interfaces may be an input/output interface, an input/output circuit, or the like. Further, the chip may further include one or more memories.

In addition, this application further provides a sidelink communication system, including the first terminal apparatus, the second terminal apparatus, the third terminal apparatus, and/or the first network apparatus in embodiments of this application.

In the several embodiments provided in this application, it should be understood that the disclosed system, apparatus, and method may be implemented in other manners. For example, the described apparatus embodiments are merely examples. For example, the unit division is merely logical function division and may be other division in actual implementations. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located in one place, or may be distributed on a plurality of network units. Some or all of the units may be selected depending on actual requirements to achieve the objectives of the solutions in embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to a conventional technology, or all or some of the technical solutions may be implemented in a form of a software product. The computer software product is stored in a storage medium, and includes several instructions for instructing a computer device (which may be a personal computer, a server, a network apparatus, or the like) to perform all or some of the steps of the methods described in embodiments of this application. The foregoing storage medium includes various media that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of this application. Variation or replacement readily figured out by a person skilled in the art within the technical scope disclosed in this application shall fall within the protection scope of this application. The protection scope of this application shall be subject to the protection scope of the claims.

What is claimed is:

1. A reference signal transmission method, comprising:
   determining, by a first communication apparatus, a first transmission parameter in at least two transmission parameters, wherein any two of the at least two transmission parameters are different, and the first transmission parameter is used to determine a first transmission resource for a first reference signal, wherein the first transmission parameter comprises a resource offset indicating a time domain difference between a start transmission resource unit for the first reference signal in a resource cluster and a resource unit with a smallest sequence number in the resource cluster; and
   sending, by the first communication apparatus, the first reference signal to a second communication apparatus on the first transmission resource.

2. The method according to claim 1, wherein:
   the determining, by a first communication apparatus, a first transmission parameter in at least two transmission parameters comprises:
   determining, by the first communication apparatus, the first transmission parameter in the at least two transmission parameters based on identification information of the first communication apparatus and a correspondence between identification information of at least two communication apparatuses and the at least two transmission parameters.

3. The method according to claim 2, wherein:
   the at least two transmission parameters and the correspondence between the identification information of the at least two communication apparatuses and the at least two transmission parameters are predefined in a protocol;
   the first communication apparatus receives first configuration information from a first network apparatus, wherein the first configuration information indicates the at least two transmission parameters and the correspondence between the identification information of the at least two communication apparatuses and the at least two transmission parameters; or
   the first communication apparatus receives second configuration information from a third communication apparatus, wherein the second configuration information indicates the at least two transmission parameters and the correspondence between the identification information of the at least two communication apparatuses and the at least two transmission parameters.

4. The method according to claim 2, wherein:
   an identifier of the first communication apparatus comprises M bits, the identification information of the first communication apparatus comprises N bits of the identifier of the first communication apparatus, the N bits belong to the M bits, and both M and N are positive integers.

5. The method according to claim 4, wherein:
the first communication apparatus sends first sidelink control information to the second communication apparatus on a resource in a second transmission resource, wherein the resource is different than the first transmission resource, and wherein the second transmission resource comprises the first transmission resource.

6. The method according to claim 5, wherein:
the first sidelink control information comprises M-N bits other than the N bits in the identifier of the first communication apparatus.

7. The method according to claim 5, wherein:
the first sidelink control information is carried on a first sidelink control channel, and the first reference signal is used for channel estimation on the first sidelink control channel.

8. The method according to claim 1, wherein:
that the first transmission parameter is used to determine a first transmission resource for a first reference signal comprises:
the first transmission parameter is used to determine a transmission pattern for the first reference signal, wherein the transmission pattern is used to determine the first transmission resource.

9. The method according to claim 1, wherein:
the first transmission resource comprises at least two sub-resources, each of the at least two sub-resources is used to transmit the first reference signal, and the at least two sub-resources are frequency division multiplexed.

10. A reference signal transmission method, comprising:
determining, by a first network apparatus, first configuration information, wherein the first configuration information is used to indicate at least two transmission parameters and a correspondence between identification information of at least two communication apparatuses and the at least two transmission parameters, any two of the at least two transmission parameters are different, the at least two transmission parameters and the correspondence between the identification information of the at least two communication apparatuses and the at least two transmission parameters are used to determine a first transmission parameter, and the first transmission parameter is used to determine a first transmission resource for a first reference signal, wherein the first transmission parameter comprises a resource offset indicating a time domain difference between a start transmission resource unit for the first reference signal in a resource cluster and a resource unit with a smallest sequence number in the resource cluster; and
sending, by the first network apparatus, the first configuration information to a first communication apparatus.

11. The method according to claim 10, wherein:
an identifier of one communication apparatus of the at least two communication apparatuses comprises M bits, the identification information of the communication apparatus of the at least two communication apparatuses comprises N bits of the identifier of the communication apparatus of the at least two communication apparatuses, the N bits belong to the M bits, and both M and N are positive integers.

12. The method according to claim 11, wherein:
the first configuration information is further used to indicate a second transmission resource, a resource in the second transmission resource is used to transmit first sidelink control information, the resource is different than the first transmission resource, and the second transmission resource comprises the first transmission resource.

13. The method according to claim 12, wherein:
the first sidelink control information comprises M-N bits other than the N bits in the identifier of the communication apparatus of the at least two communication apparatuses.

14. The method according to claim 12, wherein:
the first sidelink control information is carried on a first sidelink control channel, and the first reference signal is used for channel estimation on the first sidelink control channel.

15. The method according to claim 10, wherein:
that the first transmission parameter is used to determine a first transmission resource for a first reference signal comprises:
the first transmission parameter is used to determine a transmission pattern for the first reference signal, wherein the transmission pattern is used to determine the first transmission resource.

16. The method according to claim 10, wherein:
the first transmission resource comprises at least two sub-resources, each of the at least two sub-resources is used to transmit the first reference signal, and the at least two sub-resources are frequency division multiplexed.

17. A first communication apparatus, comprising:
one or more processors; and
a non-transitory computer readable medium storing a program to be executed by the one or more processors, wherein the program comprises instructions that cause the first communication apparatus to perform operations comprising:
determining a first transmission parameter in at least two transmission parameters, wherein any two of the at least two transmission parameters are different, and the first transmission parameter is used to determine a first transmission resource for a first reference signal, wherein the first transmission parameter comprises a resource offset indicating a time domain difference between a start transmission resource unit for the first reference signal in a resource cluster and a resource unit with a smallest sequence number in the resource cluster; and
sending the first reference signal to a second communication apparatus on the first transmission resource.

18. The apparatus according to claim 17, wherein:
the determining a first transmission parameter in at least two transmission parameters comprises:
determining the first transmission parameter in the at least two transmission parameters based on identification information of the first communication apparatus and a correspondence between identification information of at least two communication apparatuses and the at least two transmission parameters.

19. The apparatus according to claim 18, wherein:
the at least two transmission parameters and the correspondence between the identification information of the at least two communication apparatuses and the at least two transmission parameters are predefined in a protocol;

the first communication apparatus receives first configuration information from a first network apparatus, wherein the first configuration information indicates the at least two transmission parameters and the correspondence between the identification information of the at least two communication apparatuses and the at least two transmission parameters; or the first communication apparatus receives second configuration information from a third communication apparatus, wherein the second configuration information indicates the at least two transmission parameters and the correspondence between the identification information of the at least two communication apparatuses and the at least two transmission parameters.

20. The apparatus according to claim 18, wherein:

an identifier of the first communication apparatus comprises M bits, the identification information of the first communication apparatus comprises N bits of the identifier of the first communication apparatus, the N bits belong to the M bits, and both M and N are positive integers.

* * * * *